(12) United States Patent
Winger et al.

(10) Patent No.: US 7,346,111 B2
(45) Date of Patent: Mar. 18, 2008

(54) CO-LOCATED MOTION VECTOR STORAGE

(75) Inventors: Lowell L. Winger, Waterloo (CA); Elliot N. Linzer, Suffern, NY (US)

(73) Assignee: LSI Logic Corporation, Milpitas, CA (US)

( * ) Notice: Subject to any disclaimer, the term of this patent is extended or adjusted under 35 U.S.C. 154(b) by 844 days.

(21) Appl. No.: 10/732,135

(22) Filed: Dec. 10, 2003

(65) Prior Publication Data

US 2005/0129129 A1   Jun. 16, 2005

(51) Int. Cl.
*H04N 7/12*   (2006.01)
(52) U.S. Cl. ............ 375/240.24; 375/240; 375/240.01; 375/240.12; 375/240.16
(58) Field of Classification Search ................ 375/240, 375/240.01, 240.12, 240.15, 240.16, 240.24
See application file for complete search history.

(56) References Cited

U.S. PATENT DOCUMENTS

| | | | | |
|---|---|---|---|---|
| 5,946,042 | A * | 8/1999 | Kato | 375/240.15 |
| 6,519,287 | B1 * | 2/2003 | Hawkins et al. | 375/240.16 |
| 2004/0258153 | A1 | 12/2004 | Linzer | |

* cited by examiner

*Primary Examiner*—Allen Wong
(74) *Attorney, Agent, or Firm*—Christopher P. Maioran P.C.

(57) ABSTRACT

A method for processing a video bitstream is disclosed. The method generally includes the steps of (A) determining co-located motion information for a plurality of co-located sub-blocks in a co-located macroblock of the video bitstream, (B) storing the co-located motion information for (i) at least a first three of the co-located sub-blocks along a left side of the co-located macroblock, (ii) at least a second three of the co-located sub-blocks along a right side of the co-located macroblock and (iii) less than all of the co-located sub-blocks and (C) inferring current motion information for a current macroblock co-located in a different picture from the co-located macroblock using the co-located motion information that was stored.

24 Claims, 5 Drawing Sheets

CO-LOCATED MOTION VECTOR STORAGE

FIELD OF THE INVENTION

The present invention relates to motion vectors generally and, more particularly, to an apparatus and a method for co-located motion vector storage.

BACKGROUND OF THE INVENTION

Compression of digital video data is used for many applications including transmission over bandwidth-constrained channels, such as direct broadcast satellite and storage on optical media. In order to achieve more efficient compression, complex computationally intensive processes are used for encoding (compressing) and decoding (decompressing) video. For example, although MPEG-2 is known as a very efficient method for compressing video, some new, more efficient standards (i.e., "Advanced Video Coding" (AVC) standard H.264, also known as ISO/IEC 14496-10 and MPEG4-AVC, developed by the Joint Video Team, Geneva, Switzerland) are being developed.

In the H.264 standard, a macroblock represents a 16 horizontal (H) by 16 vertical (V) array of pixels having 16H×16V luminance samples and 8H×8V each of Cb and Cr chrominance samples. Referring to FIG. 1, when macroblock adaptive field/frame coding is used, macroblocks are coded in vertically adjacent pairs that comprise an array of 16H×32V pixels 10 (i.e., 16H×32V luminance samples and 8H×16V each of Cb and Cr chrominance samples) from a frame. Each macroblock pair 10 is coded either as two frame macroblocks 12a-b (i.e., two sets of vertically adjacent 16H×16V pixels from the frame) or as two field macroblocks 14a-b (i.e., one set from each of two fields of 16H×16V pixels).

Hereafter the notation "macroblock (pair)" is used to mean (i) a single macroblock if macroblock adaptive field/frame coding is not used and (ii) a macroblock pair if macroblock adaptive field/frame coding is used. The H.264 standard defines storing motion vectors for decoded macroblocks (pairs) for use in decoding other macroblocks (pairs). Specifically, to reconstruct the motion vectors for a current macroblock (pair) a decoder uses one of two sets of motion vectors. The first set involves motion vectors from neighboring macroblocks (pairs) in a current picture. A second set of constructed motion vectors involves co-located motion vectors in a different picture (i.e., the motion vectors from a macroblock (pair) in the same position as the current macroblock (pair) but in a different picture.)

Typically, a decoder embodied in an integrated circuit (IC) would use a small data cache to hold the motion vectors for one row of macroblock (pairs) for the neighbor macroblocks (pairs) in the same picture to reduce the data written to and read from an external memory, where the cache holds one macroblock (pair) row of vectors. However, the motion vectors retained for future use, such as co-located motion vectors, are typically stored to the external memory and consume considerable storage space. Unfortunately, storing large numbers of motion vectors increases a cost of a decoding or encoding system. The external memories are commonly large circuits to hold all of the motion vector data. Furthermore, the external memory devices are often implemented with high speed technology to maintain sufficient data transfer rates.

SUMMARY OF THE INVENTION

The present invention concerns a method for processing a video bitstream. The method generally comprises the steps of (A) determining co-located motion information for a plurality of co-located sub-blocks in a co-located macroblock of the video bitstream, (B) storing the co-located motion information for (i) at least a first three of the co-located sub-blocks along a left side of the co-located macroblock, (ii) at least a second three of the co-located sub-blocks along a right side of the co-located macroblock and (iii) less than all of the co-located sub-blocks and (C) inferring current motion information for a current macroblock co-located in a different picture from the co-located macroblock using the co-located motion information that was stored.

The objects, features and advantages of the present invention include providing dual block motion vector storage method and/or architecture that may (i) store motion vector information with less space (e.g., fewer bytes) than conventional methods, (ii) reduce a cost of an encoder and/or a decoder as compared with conventional implementations, (iii) reduce a size of external memories as compared with conventional encoders or decoders and/or (iv) operate with a lower speed external memory than conventional implementations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The H.264 standard generally provides that a motion vector in a video bitstream may cover a region (e.g., macroblock, macroblock partition and macroblock sub-partition) of any one of several different sizes. The sizes may include 16H×16V, 8H×16V, 16H×8V, 8H×8V, 4H×8V, 8H×4V and 4H×4V pixel regions. Moreover, every region may have zero, one or two motion vectors. For intra region prediction, no motion vectors may be defined. For single direction prediction (e.g., forward prediction and backwards prediction), a list 0 (e.g., L0) motion vector or a list 1 (e.g., L1) motion vector may be defined. Bidirectional prediction generally includes both an L0 motion vector and an L1 motion vector for each region. For direct mode prediction, the motion vectors may be inferred but not transmitted.

Figure 2:
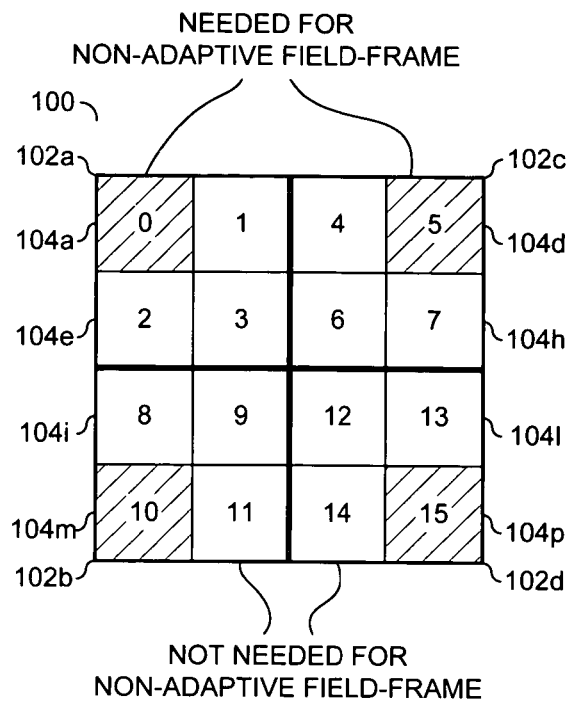
FIG. 2 is a block diagram of a frame block using inferred motion vectors.

Referring to FIG. 2, a block diagram of a frame block 100 using inferred motion vectors is shown. The H.264 standard generally restricts the way that motion vectors may be used for various Profiles and Levels. Level 2 (e.g., common interface format and smaller pictures) and below for the Extended Profile and Level 4.2 (e.g., 1080 progressive at 60 frames per second) and above for both the Extended Profile and the Main Profile generally allow only frame macroblocks (e.g., do not permit field/frame adaptive coding) and have co-located motion vectors inferred within the corresponding quadrants 102a-102d (e.g., 8×8 sub-partition of a macroblock). The above Levels of Profile generally store a motion vector information for each of the four corner 4×4 blocks 104a, 104d, 104m and 104p. The 4×4 blocks 104a-104p may also be referred to as sub-blocks. All four 4×4 blocks 104a-104p in each quadrant 102a-102d may then use the motion vectors from the corresponding corner blocks 104a, 104d, 104m or 104p. Co-located motion vectors for B-slice co-located blocks using direct mode may be inferred within the respective quadrants 102a-102d for all Levels of the Extended Profile. A co-located block may be in the same position as another block, but in a different picture. The co-located motion vectors may be associated with the co-located block.

A standard numbering scheme is generally used in the H.264 specification and the present invention to identify each of said 4×4 blocks 104a-104p with a sub-block number (e.g., 0-15). The 4×4 blocks 104a, 104b, 104e and 104f in the upper-left quadrant 102a may be numbered 0-3, respectively. The blocks 104c, 104d, 104g and 104h in the upper-right quadrant 102c may be numbered 4-7, respectively. The blocks 104i, 104j, 104m and 104n in the lower-left quadrant 102b may be numbered 8-11, respectively. The blocks 104k, 104l, 104o and 104p in the lower-right quadrant 102d may be numbered 12-15, respectively. Within each quadrant 102a-102d, the sub-block numbers 0-15 generally increase from left to right and then from top to bottom inside the quadrant.

Figure 3:
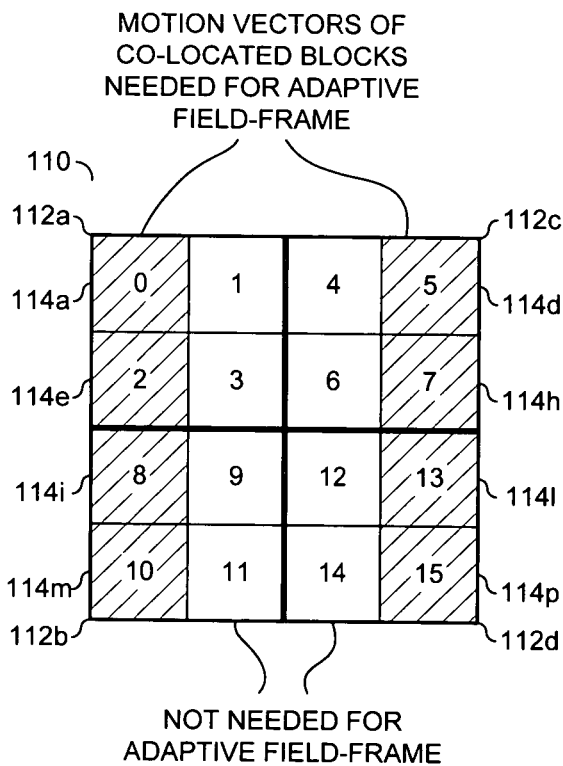
FIG. 3 is a block diagram of a block having several adjoining blocks.

Referring to FIG. 3, a block diagram of a block 110 having several adjoining blocks 114a-114p (e.g., sub-block numbers 0-15) is shown in accordance with a preferred embodiment of the present invention. In general, one motion vector (e.g., an L0 motion vector or an L1 motion vector) for every 4×4 block 114a-114p from a macroblock (pair) may be stored in memory for use in reconstructing the co-located motion vectors in another macroblock (pair). Therefore, using the general H.264 defined approach may result in storing 16 motion vectors for each 16×16 block 110 to infer the motion vectors for a B-slice block using the direct mode. However, the present invention may store between approximately half (e.g., 6 for a frame block and 8 for a field block) and most (e.g., 15), inclusively, of the available motion vectors for the entire 16×16 block 110 for particular Levels of Profile. For example, each Level of Profile in which the co-located motion vector information may be inferred within an 8×8 quadrant (e.g., 112a-112d) and do not use only frame macroblocks, only the motion vector information of the eight 4×4 blocks (e.g., two 4×4 blocks in each quadrant 112a-112d) may be stored to an external memory for later use by the encoder and/or decoder. In one embodiment, the motion information of the 4×4 blocks along the left vertical edge (e.g., blocks 114a, 114e (field only), 114i and 114m or sub-block numbers 0, 2, 8 and 10) and the 4×4 blocks along the right vertical edge (e.g., blocks 114d, 114h (field only), 114l and 114p or sub-block numbers 5, 7, 13 and 15) of the block 110 may be stored. Motion information for other sub-sets of blocks 114a-114p may be stored in different implementations to meet the criteria of a particular application. For the Main Profile, the particular levels may include Level 3 (e.g., standard definition television) through Level 4.1 (e.g., high definition television). For the Extended Profile, the particular levels may include Level 2.1 (e.g., half horizontal standard television) through Level 4.1.

Figure 1:
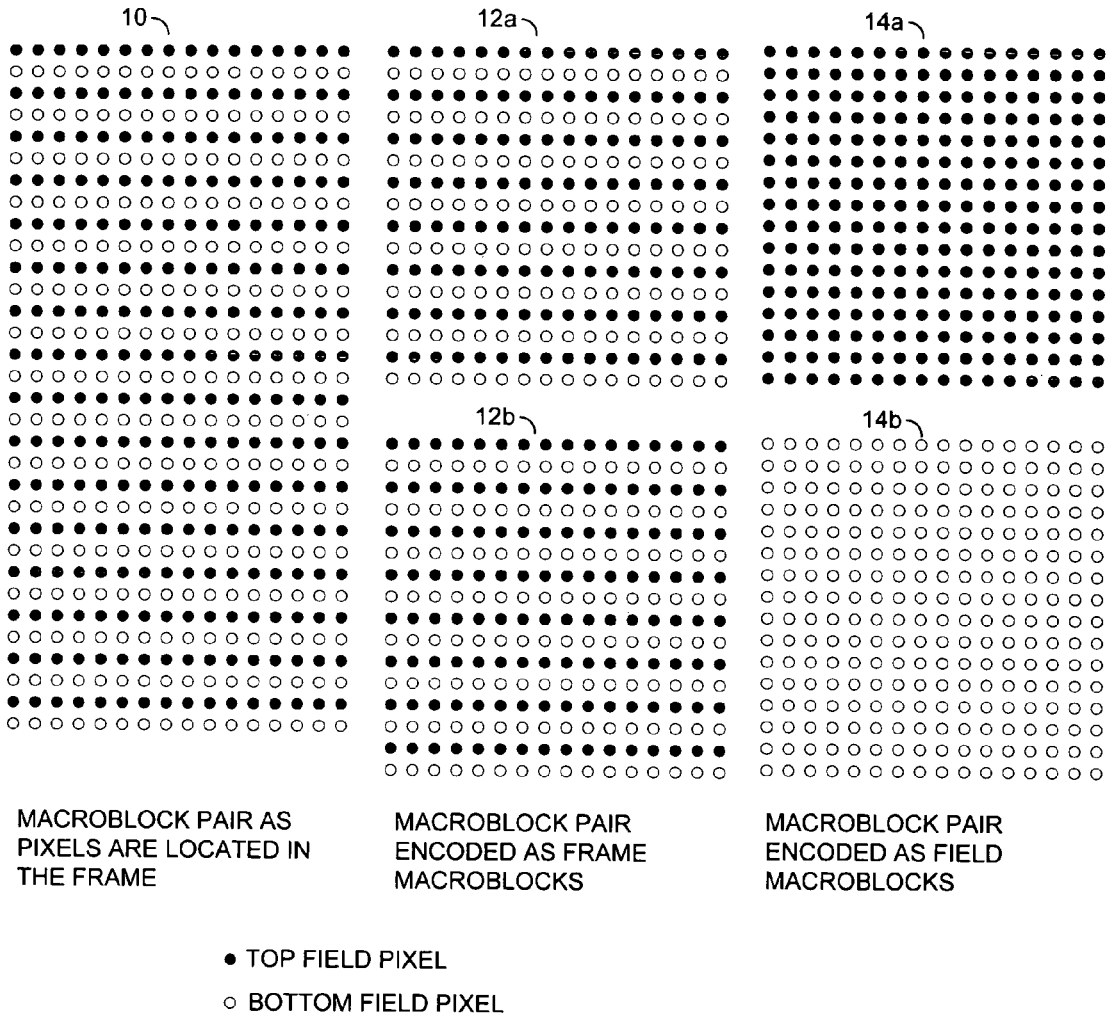
FIG. 1 is a block diagram of a conventional macroblock pair.

Storage of the eight motion vectors per block 110 may be illustrated by the following example in which adaptive field/frame coding may be used. The H.264 standard may allow encoders to operate under one of several adaptive field/frame modes to deal with interlaced frames. In a frame mode, the encoder may combine an odd field and an even field to generate a frame and then code the frame. In a field mode, the encoder may code each of the two fields independently of each other. In a third mode, the encoder may combine the two fields to form a frame, compress the frame and then split the frame into a number of pairs of vertically adjacent macroblocks of either (i) two frame macroblocks (e.g., blocks 12a and 12b in FIG. 1) or (ii) two field macroblocks (e.g., blocks 14a and 14b in FIG. 1) before coding. Therefore, the coded block 100 may have motion vectors to reference fields and/or reference frames.

Figure 4A:
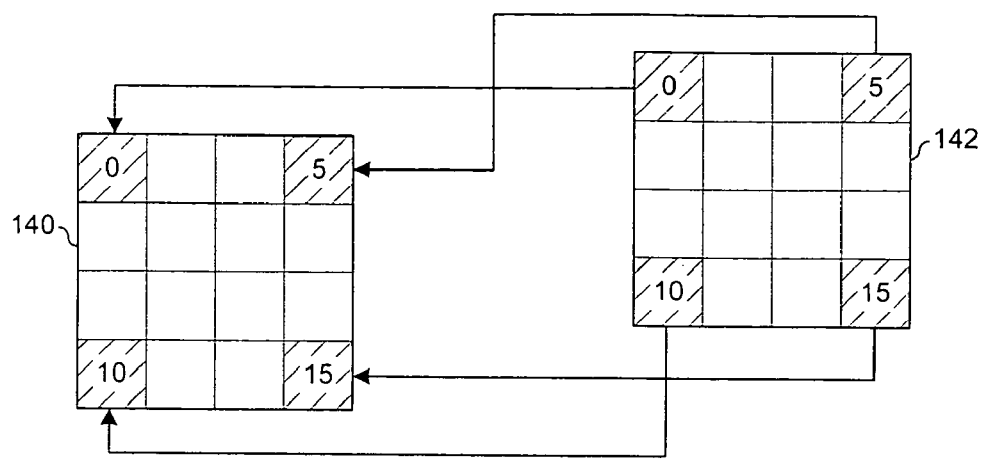
FIGS. 4a-4c are block diagrams illustrating how co-located motion vectors may be used for three example cases.
Figure 4B:
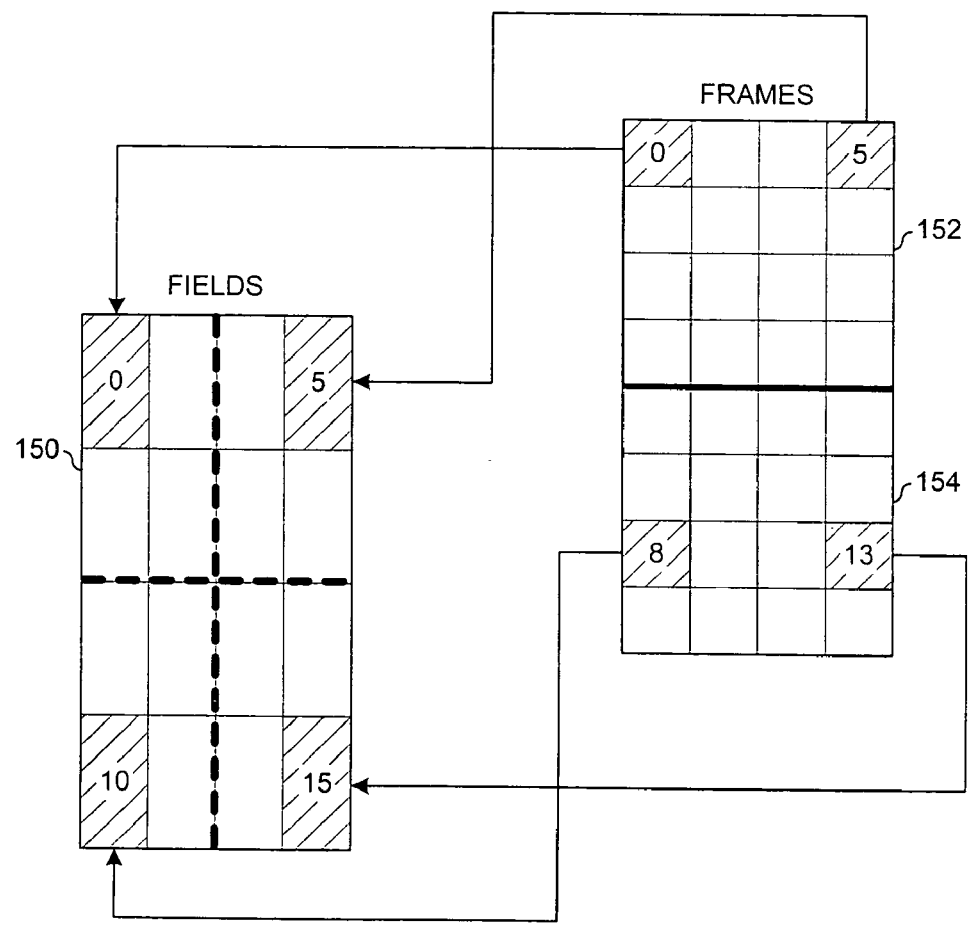
Figure 4C:
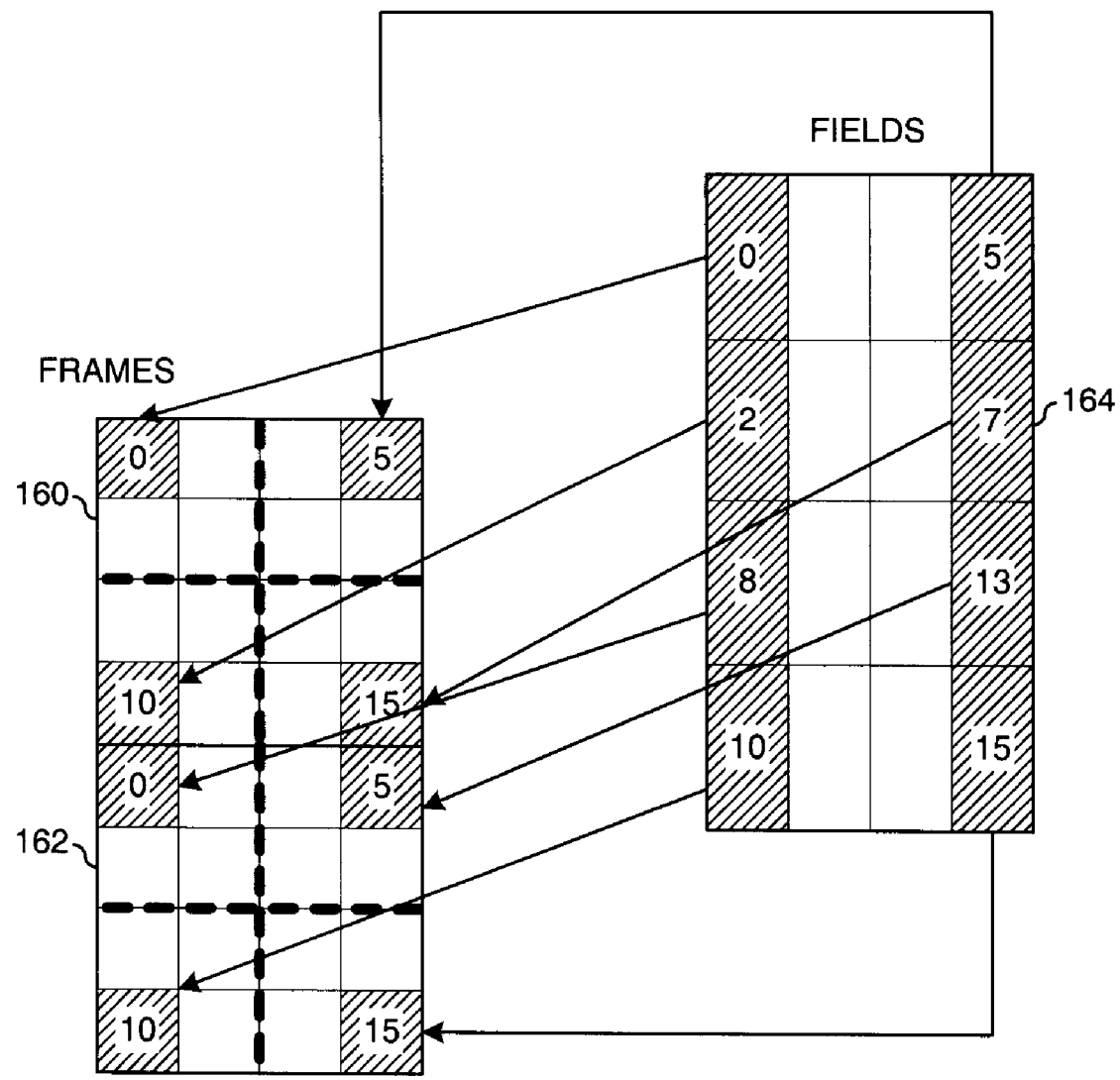

Referring to FIGS. 4a-4c, block diagrams illustrating how co-located motion vectors may be used for three example cases are shown. When a macroblock in a video bitstream is encoded or decoded, motion information (e.g., a single motion vector each for sub-block numbers 0, 2, 5, 7, 8, 10, 13, and 15) may be stored and either all or some of the motion information (e.g., a motion vector each for sub-block numbers 0, 5, 10 and 15) may be used. FIG. 4a generally illustrates how co-located motion vectors may be used when either (i) a current macroblock 140 may be in the field mode and a co-located macroblock 142 may be in the field mode or (ii) the current macroblock 140 may be in the frame mode and the co-located macroblock 142 may be in the frame mode (e.g., the current macroblock 140 and the co-located macroblock 142 may be in the same mode). For example, the motion vector from block 0 from the co-located macroblock 142 may be used for block 0 and therefore all of the upper-left quadrant of the current macroblock 140. The motion vector from block 5 from the co-located macroblock 142 may be used for block 5 and therefore all of the upper-right quadrant of the current macroblock 140. The vector from block 10 from the co-located macroblock 142 may be used for block 10 and therefore all of the lower-left quadrant of the current macroblock 140. The vector from block 15 from the co-located macroblock 142 may be used for block 15 and therefore all of the lower-right quadrant of the current macroblock 140.

Referring to FIG. 4b, a block diagram illustrating how co-located motion vectors may be used when a current macroblock 150 may be in the field mode and the co-located macroblocks 152 and 154 may be in the frame mode. When the current macroblock 150 is in the field mode (e.g., two spatially interlaced field macroblocks from different fields) and the co-located data is in the frame mode, two vertically adjacent co-located frame macroblocks 152 (e.g., from an even row) and 154 (e.g., from an odd row) are generally used to infer the current motion vector information. For example, the motion vector from block 0 from the upper co-located macroblock 152 may be used for block 0 and therefore all of the upper-left quadrant of the current macroblock 150. The motion vector from block 5 from the upper co-located macroblock 152 may be used for block 5 and therefore all of the upper-right quadrant of the current macroblock 150. The motion vector from block 8 from the lower co-located macroblock 154 may be used for block 10 and therefore all of the lower-left quadrant of the current macroblock 150. The motion vector from block 13 from the lower co-located macroblock 154 may be used for block 15 and therefore all of the lower-right quadrant of the current macroblock 150.

As such, the motion information for at least the blocks 0, 5, 10 and 15 for the co-located macroblock 152 and at least the blocks 0, 5, 8, 10, 13 and 15 for the co-located macroblock 154 may be stored.

Referring to FIG. 4c, a block diagram illustrating how co-located motion vectors may be used when a pair of current macroblocks 160 and 162 may be in the frame mode and the co-located macroblock 164 may be in the field mode. When the pair of current macroblocks 160 and 162 are in the frame mode and the co-located data is in the field mode, the two vertically adjacent current macroblocks 160 and 162 may get co-located motion vector information from the same co-located macroblock 164. For example, the motion vector from block 0 from the co-located macroblock 164 may be used for block 0 and therefore all of the upper-left quadrant of the upper current macroblock 160. The motion vector from block 5 from the co-located macroblock 164 may be used for block 5 and therefore all of the upper-right quadrant of the upper current macroblock 160. The motion vector from block 2 from the co-located macroblock 164 may be used for block 10 and therefore all of the lower-left quadrant of the upper current macroblock 160. The motion vector from block 7 from the co-located macroblock 164 may be used for block 15 and therefore all of the lower-right quadrant of the upper current macroblock 160. Similarly, the motion vector from block 8 from the co-located macroblock 164 may be used for block 0 and therefore all of the lower-left quadrant of the lower current macroblock 162. The motion vector from block 13 from the co-located macroblock 164 may be used for block 5 and therefore all of the lower-right quadrant of the lower current macroblock 162. The motion vector from block 10 from the co-located macroblock 164 may be used for block 10 and therefore all of the lower-left quadrant of the lower current macroblock 162. The motion vector from block 15 from the co-located macroblock 164 may be used for block 15 and therefore all of the lower-right quadrant of the lower current macroblock 162. An examination of all cases illustrated in FIGS. 4a, 4b and 4c generally shows that storing the motion vector information only from the sub-blocks 0, 2, 5, 7, 8, 10, 13, and 15 may suffice for any useful co-located motion vectors in future encoding or decoding.

When a macroblock is encoded or decoded, it may be unknown if the macroblock will be used for direct mode for field macroblocks, frame macroblocks, or both. Examination of FIGS. 4a-4c generally show that even without knowing how co-located blocks may be used, it may suffice to store motion information for (i) blocks 0, 2, 5, 7, 8, 10, 13, and 15 for a field macroblock, (ii) blocks 0, 5, 10, and 15 for a frame macroblock on an even macroblock row (e.g., macroblock 152 in FIG. 4b) and (iii) blocks 0, 5, 8, 10, 13, and 15 for a frame macroblock on an odd macroblock row (e.g., macroblock 154 in FIG. 4b). In a first embodiment, motion information from blocks 0, 2, 5, 7, 8, 10, 13, and 15 may be stored for every macroblock. In a second embodiment, motion information from blocks 0, 2, 5, 7, 8, 10, 13, and 15 may be stored for field macroblocks, motion information for blocks 0, 5, 10, and 15 may be stored for frame macroblocks in even macroblock rows, and motion information for blocks 0, 5, 8, 10, 13, and 15 may be stored for frame macroblocks in odd macroblock rows. The first embodiment may provide a simpler or more regular structure, whereas the second embodiment may use less storage and bandwidth where there are many frame macroblocks. For both embodiments, motion information may be stored for at most two blocks in each quadrant 112a-112d (e.g., at most 8 blocks/macroblock).

Since motion information may be stored for at most two blocks for each quadrant 112a-112d, the present invention may operate with a small external memory, access the external memory at a lower speed and/or consume a lower external memory bandwidth than conventional approaches. Furthermore, an encoder and/or decoder implementing the present invention may have a reduced cost and may consume less space on integrated circuits than conventional encoders and decoders since fewer motion vectors may be moved to and from the external memory.

Figure 5:
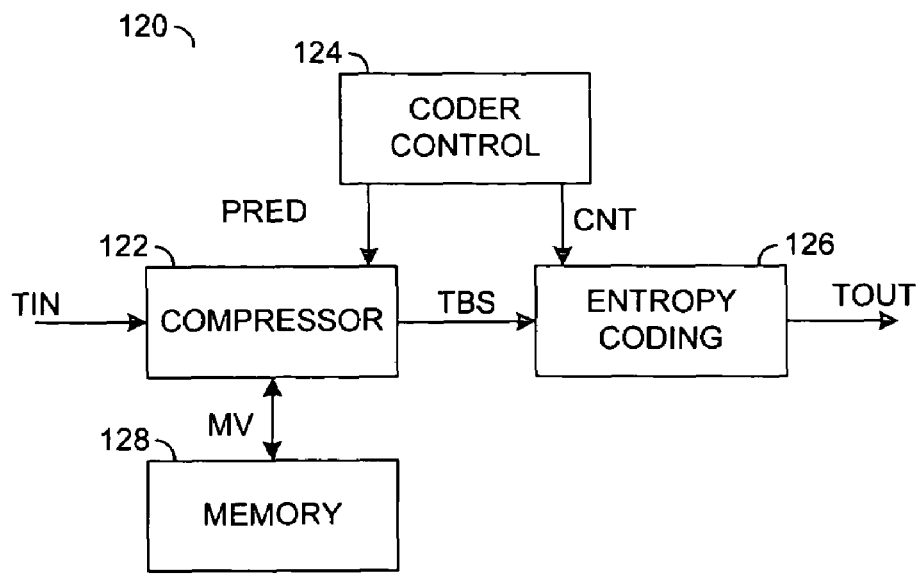
FIG. 5 is a partial block diagram of an example implementation of an encoder apparatus.

Referring to FIG. 5, a partial block diagram of an example implementation of an encoder apparatus 120 is shown. The encoder apparatus 120 may be implemented as a video bitstream encoder apparatus or system. The encoder apparatus 120 generally comprises a circuit 122, a circuit 124, a circuit 126 and a memory 128. The circuit 122 may receive a bitstream or signal (e.g., TIN). A bitstream or signal (e.g., TOUT) may be generated by the circuit 126.

The circuit 122 may be implemented as a compression circuit or module. The compression circuit 122 may be operational to compress the blocks within the signal TIN thereby generating motion vectors. Compression may be determined by a signal (e.g., PRED) received from the circuit 124. A signal (e.g., MV) may exchange motion vectors between the compression circuit 122 and the memory 128. During compression, the motion vectors may be written to the memory 128. During reconstruction of a reference block the motion vectors may be read from the memory 128.

The circuit 124 may be implemented as a code control circuit. The circuit 124 may generate the signal PRED conveying the prediction type used by the macroblocks. The code control circuit 124 may also generate a signal (e.g., CNT). The signal CNT may provide coding controls to the circuit 126.

The circuit 126 may be implemented as a coding circuit. In one embodiment, the coding circuit 126 may be an entropy coding circuit. The entropy coding circuit 126 may receive the blocks and the associated groups of motion vectors from the compression circuit 122 via a bitstream or signal (e.g., TBS). The entropy coding circuit 126 may be configured to encode the signal TBS to generate the signal TOUT for transmission and/or storage. In one embodiment, the signal TOUT may be implemented as a Network Abstraction Layer defined by the H.264 standard.

The memory 128 may be implemented as an external memory. The memory 128 is generally operational to store the motion vectors for the blocks while the blocks are being encoded. The memory 128 may be configured to store other data used for encoding the bitstream data. Other types of memories may be implemented to meet the criteria of a particular application.

Figure 6:
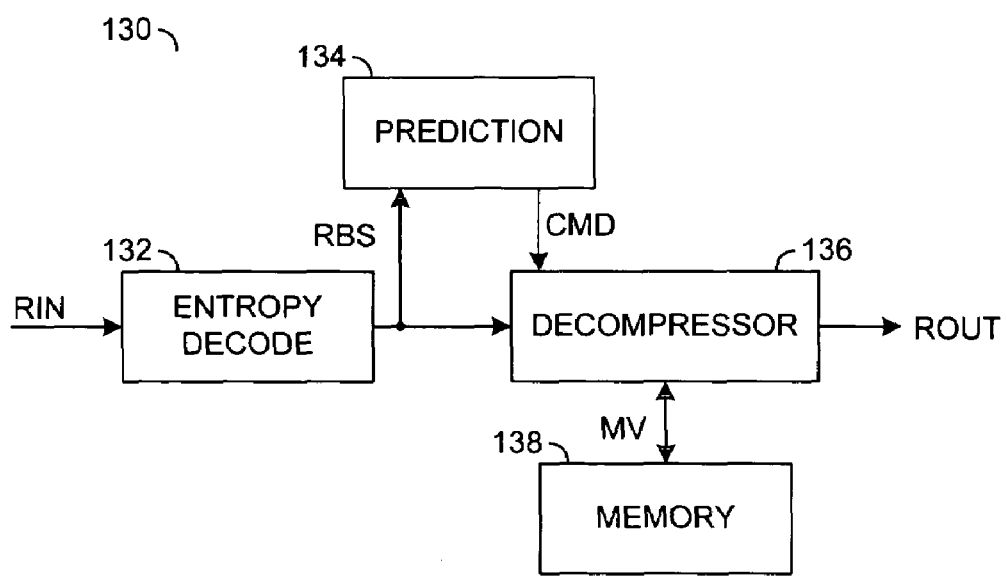
FIG. 6 is a partial block diagram of an example implementation of a decoder apparatus.

Referring to FIG. 6, a partial block diagram of an example implementation of a decoder apparatus 130 is shown. The decoder apparatus 130 may be implemented as a video bitstream decoder or system. The decoder apparatus 130 generally comprises a circuit 132, a circuit 134, a circuit 136 and a memory 138. The circuit 132 may receive an input bitstream or signal (e.g., RIN). The circuit 136 may generate an output bitstream or signal (e.g., ROUT).

The circuit 132 may be implemented as a decoder circuit. In one embodiment, the decoder circuit 132 may be implemented as an entropy decoder circuit 132. The entropy decoder circuit 132 may be operational to decode the bitstream signal TOUT generated by the entropy coding circuit 126 (e.g., TOUR=RIN). A decoded bitstream or signal (e.g., RBS) may be presented by the entropy decoder circuit 132 to the circuits 134 and 136.

The circuit 134 may be implemented as a prediction circuit. The prediction circuit 134 may be operational to determine if inter or intra prediction has been implemented for the various macroblocks of the pictures in the signal RBS. The prediction circuit 134 may generate a command signal (e.g., CMD) to the circuit 136 indicating the prediction type.

The circuit 136 may be implemented as a decompression circuit. The decompression circuit 136 may examine the compressed groups to determine how the motion vectors should be used. The decompression circuit 136 may store the motion vectors from decoded blocks that may be used for inferring motion vectors of co-located blocks the memory 128 via a signal (e.g., MV). The stored motion vectors may be read from the memory 138 to calculate the motion vectors for B-slice blocks coded under the direct mode (e.g., no associated motion vectors were transmitted in the signal TOUT) The inferred motion vectors may then be used in generating the signal ROUT.

The memory 138 may be implemented as an external memory. The memory 138 is generally operational to store the motion vectors for the blocks for later use in calculating inferred motion vectors for the co-located blocks. The memory 138 may be configured to store other data used for decoding the bitstream data. Other types of memories may be implemented to meet the criteria of a particular application.

The various signals of the present invention may be implemented as single-bit or multi-bit signals in a serial and/or parallel configuration. While the invention has been particularly shown and described with reference to the preferred embodiments thereof, it will be understood by those skilled in the art that various changes in form and details may be made without departing from the spirit and scope of the invention.

The invention claimed is:

1. A method for processing a video bitstream, comprising the steps of:
   (A) determining co-located motion information of a plurality of co-located sub-blocks in a co-located macroblock of said video bitstream;
   (B) storing said co-located motion information of (i) at least a first three of said co-located sub-blocks along a left side of said co-located macroblock, (ii) at least a second three of said co-located sub-blocks along a right side of said co-located macroblock and (iii) less than all of said co-located sub-blocks;
   (C) inferring current motion information of a current macroblock co-located in a different picture from said co-located macroblock using said co-located motion information that was stored, wherein said current motion information is inferred without measuring an inter-picture difference; and
   (D) generating a processed signal by one of (i) compressing said video bitstream using said current motion information and (ii) decompressing said video bitstream using said current motion information.

2. The method according to claim 1, wherein (i) said first three co-located sub-blocks comprise a sub-block number 0, a sub-block number 8 and a sub-block number 10 and (ii) said second three co-located sub-blocks comprise a sub-block number 5, a sub-block number 13 and a sub-block number 15 per an H.264 numbering.

3. The method according to claim 1, wherein step (B) comprises the sub-steps of:
   storing said co-located motion information of at least a first four of said co-located sub-blocks along said left side; and
   storing said co-located motion information of at least a second four of said co-located sub-blocks along said right side.

4. The method according to claim 3, wherein said first four co-located sub-blocks comprise a sub-block number 0, a sub-block number 2, a sub-block number 8 and a sub-block number 10 of said co-located macroblock per an H.264 numbering.

5. The method according to claim 3, wherein said second four co-located sub-blocks comprise a sub-block number 5, a sub-block number 7, a sub-block number 13 and a sub-block number 15 of said co-located macroblock per an H.264 numbering.

6. The method according to claim 1, wherein step (C) comprises the sub-steps of:
   inferring a first portion of said current motion information of a current sub-block number 10 of an even-macroblock row frame macroblock from a first portion of said co-located motion information of a co-located sub-block number 2 of said co-located macroblock per an H.264 numbering; and
   inferring a second portion of said current motion information of a current sub-block number 0 of an odd-macroblock row frame macroblock in said current macroblock from a second portion of said co-located motion information of a co-located sub-block number 8 of said co-located macroblock per said H.264 numbering.

7. The method according to claim 1, wherein step (C) comprises the sub-steps of:
   inferring a first portion of said current motion information of a current sub-block number 15 of an even-macroblock row macroblock from a first portion of said co-located motion information of a co-located sub-block number 7 of said co-located macroblock per an H.264 numbering; and
   inferring a second portion of said current motion information of a current sub-block number 5 of an odd-macroblock row frame macroblock in said current macroblock from a second portion of said co-located motion information of a co-located sub-block number 13 of said co-located macroblock per said H.264 numbering.

8. A method for processing a video bitstream, comprising the steps of:
   (A) determining co-located motion information of a plurality of co-located sub-blocks in a co-located macroblock of said video, said co-located macroblock comprising a frame macroblock in an adaptive field/frame picture while in a first mode and a field macroblock while in a second mode;
   (B) storing said co-located motion information of between at least six and less than all of said co-located sub-blocks;
   (C) inferring current motion information of a current macroblock co-located in a different picture from said co-located macroblock using said co-located motion information that was stored, wherein said current motion information is inferred without measuring an inter-picture difference; and
   (D) generating a processed signal by one of (i) compressing said video bitstream using said current motion information and (ii) decompressing said video bitstream using said current motion information.

9. The method according to claim 8, wherein said co-located macroblock comprises said field macroblock.

10. The method according to claim 9, wherein step (B) comprises the sub-step of:
storing said co-located motion information of not more than eight of said co-located sub-blocks.

11. The method according to claim 8, wherein said co-located macroblock comprises two frame macroblocks.

12. The method according to claim 11, wherein step (B) comprises the sub-step of:
storing said co-located motion information of not more than ten of said co-located sub-blocks between said two frame macroblocks.

13. An apparatus comprising:
a memory; and
a circuit configured to (i) determine co-located motion information of a plurality of co-located sub-blocks in a co-located macroblock of a video bitstream, (ii) store said co-located motion information of (a) at least three of said co-located sub-blocks along a left side of said co-located macroblock, (b) at least three of said co-located sub-blocks along a right side of said co-located macroblock and (c) less than all of said co-located sub-blocks in said memory and (iii) infer current motion information of a current macroblock co-located in a different picture from said co-located macroblock using said co-located motion information stored in said memory, wherein said current motion information is inferred without measuring an inter-picture difference.

14. The apparatus according to claim 13, wherein said co-located macroblock comprises two field macroblocks.

15. The apparatus according to claim 14, wherein said current macroblock comprises two frame macroblocks arranged vertically.

16. The apparatus according to claim 13, wherein said current motion information of a first half of said current macroblock is inferred only from said co-located motion information of a first frame macroblock of said co-located macroblock.

17. The apparatus according to claim 16, wherein said current motion information of a second half of said current macroblock is inferred only from said co-located motion information of a second frame macroblock of said co-located macroblock.

18. An apparatus comprising:
a memory; and
a circuit configured to (i) determine co-located motion information of a plurality of co-located sub-blocks in a co-located macroblock of a video bitstream, said co-located macroblock comprising a frame macroblock in an adaptive field/frame picture while in a first mode and a field macroblock while in a second mode, (ii) store said co-located motion information of between at least six and less than all of said co-located sub-blocks in said memory and (iii) infer a plurality of current motion information of a current macroblock co-located in a different picture from said co-located macroblock using said co-located motion information stored in said memory, wherein said current motion information is inferred without measuring an inter-picture difference.

19. The apparatus according to claim 18, wherein said co-located macroblock comprises said field macroblock.

20. The apparatus according to claim 19, wherein said circuit is further configured to use said co-location motion information from only four of said co-located sub-blocks.

21. The apparatus according to claim 18, wherein said co-located macroblock comprises two frame macroblocks arranged vertically.

22. The apparatus according to claim 21, wherein said circuit is further configured to infer said current motion information of each quadrant of said current macroblock from said co-located motion information in a corresponding quadrant of said co-located macroblock.

23. A method for processing a video bitstream, comprising the steps of:
(A) determining co-located motion information for a plurality of co-located sub-blocks in a co-located macroblock of said video bitstream;
(B) storing said co-located motion information for (i) at least a first three of said co-located sub-blocks along a left side of said co-located macroblock, (ii) at least a second three of said co-located sub-blocks along a right side of said co-located macroblock and (iii) less than all of said co-located sub-blocks;
(C) inferring current motion information for a current macroblock co-located in a different picture from said co-located macroblock using said co-located motion information that was stored; and
(D) generating a processed signal by one of (i) compressing said video bitstream using said current motion information and (ii) decompressing said video bitstream using said current motion information, wherein:
(i) step (B) comprises the sub-steps of
storing said co-located motion information of at least a first four of said co-located sub-blocks along said left side, and
storing said co-located motion information of at least a second four of said co-located sub-blocks along said right side;
(ii) said first four co-located sub-blocks comprise a sub-block number 0, a sub-block number 2, a sub-block number 8 and a sub-block number 10 of said co-located macroblock per an H.264 standard for numbering; and
(iii) step (C) comprises the sub-steps of:
inferring a first portion of said current motion information for a sub-block number 0 of an even-macroblock row frame macroblock in said current macroblock from a first portion of said co-located motion information for said sub-block number 0 of said co-located macroblock,
inferring a second portion of said current motion information for a sub-block number 10 of said even-macroblock row frame macroblock from a second portion of said co-located motion information for said sub-block number 2 of said co-located macroblock,
inferring a third portion of said current motion information for a sub-block number 0 of an odd-macroblock row frame macroblock in said current macroblock from a third portion of said co-located motion information for said sub-block number 8 of said co-located macroblock, and
inferring a fourth portion of said current motion information for a sub-block number 10 of said odd-macroblock row frame macroblock from a fourth portion of said co-located motion information for said sub-block 10 of said co-located macroblock.

24. A method for processing a video bitstream, comprising the steps of:
(A) determining co-located motion information for a plurality of co-located sub-blocks in a co-located macroblock of said video bitstream;

(B) storing said co-located motion information for (i) at least a first three of said co-located sub-blocks along a left side of said co-located macroblock, (ii) at least a second three of said co-located sub-blocks along a right side of said co-located macroblock and (iii) less than all of said co-located sub-blocks; and (C) inferring current motion information for a current macroblock co-located in a different picture from said co-located macroblock using said co-located motion information that was stored; and (D) generating a processed signal by one of (i) compressing said video bitstream using said current motion information and (ii) decompressing said video bitstream using said current motion information, wherein:

(i) step (B) comprises the sub-steps of storing said co-located motion information of at least a first four of said co-located sub-blocks along said left side, and storing said co-located motion information of at least a second four of said co-located sub-blocks along said right side;

(ii) said second four co-located sub-blocks comprise a sub-block number 5, a sub-block number 7, a sub-block number 13 and a sub-block number 15 of said co-located macroblock per an H.264 standard for numbering; and (iii) step (C) comprises the sub-steps of inferring a first portion of said current motion information for a sub-block number 5 of an even-macroblock row frame macroblock in said current macroblock from a first portion of said co-located motion information for said sub-block number 5 of said co-located macroblock, inferring a second portion of said current motion information for a sub-block number 15 of said even-macroblock row macroblock from a second portion of said co-located motion information for said sub-block number 7 of said co-located macroblock, inferring a third portion of said current motion information for a sub-block number 5 of an odd-macroblock row frame macroblock in said current macroblock from a third portion of said co-located motion information for said sub-block number 13 of said co-located macroblock, and inferring a fourth portion of said current motion information for a sub-block number 15 of said odd-macroblock row frame macroblock from a fourth portion of said co-located motion information for said sub-block 15 of said co-located macroblock.

* * * * *